No. 735,808. Patented August 11, 1903.

UNITED STATES PATENT OFFICE.

WILLIAM PETO AND JAMES WILLIAM THOMAS CADETT, OF ASHLEAD, ENGLAND.

COMPOSITION OF MATTER FOR BATTERY-ELECTROLYTES.

SPECIFICATION forming part of Letters Patent No. 735,808, dated August 11, 1903.

Application filed March 14, 1903. Serial No. 147,761. (No specimens.)

*To all whom it may concern:*

Be it known that we, WILLIAM PETO and JAMES WILLIAM THOMAS CADETT, both subjects of the King of Great Britain and both residing at Ashlead, in the county of Surrey, England, have invented a new and useful composition of matter to be used as a plastic or semisolid electrolyte for electric accumulators in lieu of the liquid electrolyte at present in use, whereby such accumulators are rendered more efficient and convenient and the risk of spilling the electrolyte is greatly minimized.

The following is a specification of such new and useful composition of matter.

Our composition consists of powdered or precipitated sulfate of lead moistened with dilute sulfuric acid of about the average strength used in electric accumulators, which ingredients are combined in about the following proportions, viz: finely-precipitated sulfate of lead, one pound; dilute sulfuric acid of about specific gravity 1.2, four ounces. These ingredients are thoroughly mixed together either by hand or mechanically until they form a soft plastic mass of a paste-like consistency.

The proportions stated above are subject to some variation, according to the quality of the sulfate of lead, as some descriptions of sulfate of lead take up more acid than others, while the strength of the acid is varied within ordinary limits, according to the purpose for which the accumulators are to be used. The requisite proportion of acid can be easily regulated by allowing the mixture to stand awhile, when any excess of acid will rise and float on the top and can then be poured off. Sufficient acid must, however, be used to render the composition soft and plastic, as if it be made too stiff the gasing of the accumulator may produce air-spaces therein that may impair the efficiency of the accumulator.

What we claim, and desire to secure by Letters Patent of the United States, is—

As a semisolid plastic electrolyte of a paste-like consistency for electric accumulators a composition of matter consisting of powdered or precipitated sulfate of lead moistened with dilute sulfuric acid and thoroughly mixed together, the strength of the acid being varied within ordinary limits according to the purpose for which the accumulator or accumulators is or are to be used, while the exact proportions of the ingredients are regulated by the quality of the sulfate of lead employed all substantially as hereinbefore specified.

WILLIAM PETO.
JAMES WILLIAM THOMAS CADETT.

Witnesses:
AUGS. SHIRLEY BOWDEN,
RENÉ BOWDEN.